US012315443B2

(12) United States Patent
Zhang et al.

(10) Patent No.: US 12,315,443 B2
(45) Date of Patent: May 27, 2025

(54) DISPLAY PANEL, DRIVING CIRCUIT AND DISPLAY DEVICE FOR AMELIORATING COLOR CAST PHENOMENON

(71) Applicant: Wuhan Tianma Micro-Electronics Co., Ltd., Wuhan (CN)

(72) Inventors: Di Zhang, Wuhan (CN); Dongxu Xiang, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 178 days.

(21) Appl. No.: 18/109,418

(22) Filed: Feb. 14, 2023

(65) Prior Publication Data

US 2024/0177667 A1 May 30, 2024

(30) Foreign Application Priority Data

Nov. 30, 2022 (CN) ......................... 202211521924.7

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01); *G09G 2310/0294* (2013.01); *G09G 2310/08* (2013.01); *G09G 2320/0233* (2013.01); *G09G 2320/0242* (2013.01); *G09G 2320/0626* (2013.01)

(58) Field of Classification Search
CPC ... G09G 3/30–3291; G09G 2300/0819; G09G 2300/0842; G09G 2300/0861; G09G 2310/0294; G09G 2310/08; G09G 2320/0233; G09G 2320/0242; G09G 2320/0626
See application file for complete search history.

(56) References Cited

U.S. PATENT DOCUMENTS

2018/0261163 A1* 9/2018 Hyun ..................... G09G 3/003
2020/0312234 A1* 10/2020 Lin ....................... G06F 3/0412
2021/0134210 A1* 5/2021 In ......................... G09G 3/3233
(Continued)

FOREIGN PATENT DOCUMENTS

CN 110352453 A 10/2019
CN 115331626 A * 11/2022 ............... G09G 3/32

*Primary Examiner* — Keith L Crawley
(74) *Attorney, Agent, or Firm* — Anova Law Group, PLLC

(57) ABSTRACT

The present disclosure discloses a display panel, a driving circuit and a display device. The display panel includes a pixel circuit and a light-emitting element. A data writing cycle of the pixel circuit includes a data writing phase and m holding phases. In the data writing phase, the first scan signal includes at least one first valid pulse. A light emission control signal includes one second valid pulse in the data writing phase and in each holding phase. The working modes of the display panel includes a first mode. In the first mode, the interval between the start time of the first valid pulse in the (i+1)-th data writing cycle and the end time of the last second valid pulse in the i-th data writing cycle is t1, and in the data writing phase, the duration of the light emission control signal being an invalid pulse is t2, $$\frac{t1}{t2} \geq 1\%, m \geq 1, i \geq 1,$$

and m and i are integers.

19 Claims, 15 Drawing Sheets

(56) References Cited

U.S. PATENT DOCUMENTS

| | | | | |
|---|---|---|---|---|
| 2021/0407419 | A1 | 12/2021 | Li et al. | |
| 2023/0230535 | A1* | 7/2023 | Hu | G09G 3/3266 345/55 |
| 2024/0144861 | A1* | 5/2024 | Kim | G09G 3/32 |
| 2024/0221646 | A1* | 7/2024 | Chen | G09G 3/3233 |

* cited by examiner

DISPLAY PANEL, DRIVING CIRCUIT AND DISPLAY DEVICE FOR AMELIORATING COLOR CAST PHENOMENON

CROSS-REFERENCE TO RELATED APPLICATION

This application claims the priority of Chinese Patent Application No. 202211521924.7, filed on Nov. 30, 2022, the content of which is incorporated by reference in its entirety.

TECHNICAL FIELD

The present disclosure generally relates to the field of display technology and, more particularly, relates to a display panel, a driving circuit and a display device.

BACKGROUND

A display panel may include light-emitting elements that emit light of different colors. For example, a display panel includes a light-emitting element R that emits red light, a light-emitting element G that emits green light, and a light-emitting element B that emits blue light. R, G and B may be controlled to emit light together, and RGB may be made to emit white light with a proper brightness ratio.

However, the applicant found that in a low brightness mode, when a display panel switches between black and white images, the white images may have a color cast phenomenon.

SUMMARY

One aspect of the present disclosure provides a display panel. The display panel includes a pixel circuit and a light-emitting element; where the pixel circuit includes a light emission control module, and the light emission control module is configured to make the light-emitting element emit light under the control of a light emission control signal; the pixel circuit includes a first pixel circuit, the first pixel circuit includes a first reset module, the light-emitting element includes a first light-emitting element that emits light of a first color, and the first reset module provides a first reset signal to the first light-emitting element under the control of a first scan signal; a data writing cycle of the pixel circuit includes a data writing phase and m holding phases; in the data writing phase, the first scan signal includes at least one first valid pulse; the light emission control signal includes one second valid pulse in the data writing phase and in each of the holding phases; and the working modes of the display panel include a first mode, in the first mode, the interval between the start time of the first valid pulse in the (i+1)-th data writing cycle and the end time of the last second valid pulse in the i-th data writing cycle is t1, and in the data writing phase, the duration of the light emission control signal being an invalid pulse is t2, $$\frac{t1}{t2} \geq 1\%, m \geq 1, i \geq 1,$$

and m and i are integers.

Another aspect of the present disclosure provides a display panel. The display panel includes a pixel circuit and a light-emitting element; where the pixel circuit includes a light emission control module, the light emission control module is configured to make the light-emitting element emit light under the control of a light emission control signal. The pixel circuit includes a first pixel circuit, the first pixel circuit includes a first reset module, the light-emitting element includes a first light-emitting element that emits light of a first color, and the first reset module provides a first reset signal to the first light-emitting element under the control of a first scan signal. A data writing cycle of the pixel circuit includes a data writing phase and m holding phases. In the data writing phase, the first scan signal includes at least one first valid pulse. The light emission control signal includes one second valid pulse in the data writing phase and in each of the holding phases. The working modes of the display panel include a first mode, in the first mode, the interval between the start time of the first valid pulse in the (i+1)-th data writing cycle and the end time of the last second valid pulse in the i-th data writing cycle is t1, $$t1 \geq 1H, H = \frac{1}{F \times n},$$

where n is the number of rows of pixel circuit, F is the refresh rate of the display panel in the first mode, m≥1, i≥1, and m and i are integers.

Another aspect of the present disclosure provides a driving circuit. The driving circuit is configured to provide signals for a display panel described in the disclosed embodiments of the present disclosure. The display panel includes a pixel circuit and a light-emitting element. The pixel circuit includes a light emission control module, which is configured to make the light-emitting element emit light under the control of a light emission control signal. The pixel circuit includes a first pixel circuit, the first pixel circuit includes a first reset module, the light-emitting element includes a first light-emitting element that emits light of a first color, and the first reset module provides a first reset signal for the first light-emitting element under the control of a first scan signal. A data writing cycle of the pixel circuit includes a data writing phase and m holding phases. In the data writing phase, the first scan signal includes at least one first valid pulse, the light emission control signal includes one second valid pulse in the data writing phase and in each holding phase. The working modes of the display panel include a first mode, in the first mode, the interval between the start time of the first valid pulse in the (i+1)-th data writing cycle and the end time of the last second valid pulse in the i-th data writing cycle is t1, and in the data writing phase, the duration of the light emission control signal being an invalid pulse is t2, $$\frac{t1}{t2} \geq 1\%, \text{ and/or, } t1 \geq 1H, H = \frac{1}{F \times n},$$

where n is the number of rows of pixel circuit, F is the refresh rate of the display panel in the first mode, m≥1, i≥1, and m and i are integers.

Another aspect of the present disclosure provides a display device, including the above-mentioned display panel.

Other aspects of the present disclosure may be understood by those skilled in the art in light of the description, the claims, and the drawings of the present disclosure.

BRIEF DESCRIPTION OF THE DRAWINGS

Other features, objects and advantages of the present disclosure will become more apparent by reading the following detailed description of the non-limiting embodiments of the present disclosure with reference to the accompanying drawings, where the same or like drawing symbols refer to the same or like features. The drawings are not drawn to scale.

DETAILED DESCRIPTION

Figure 1:
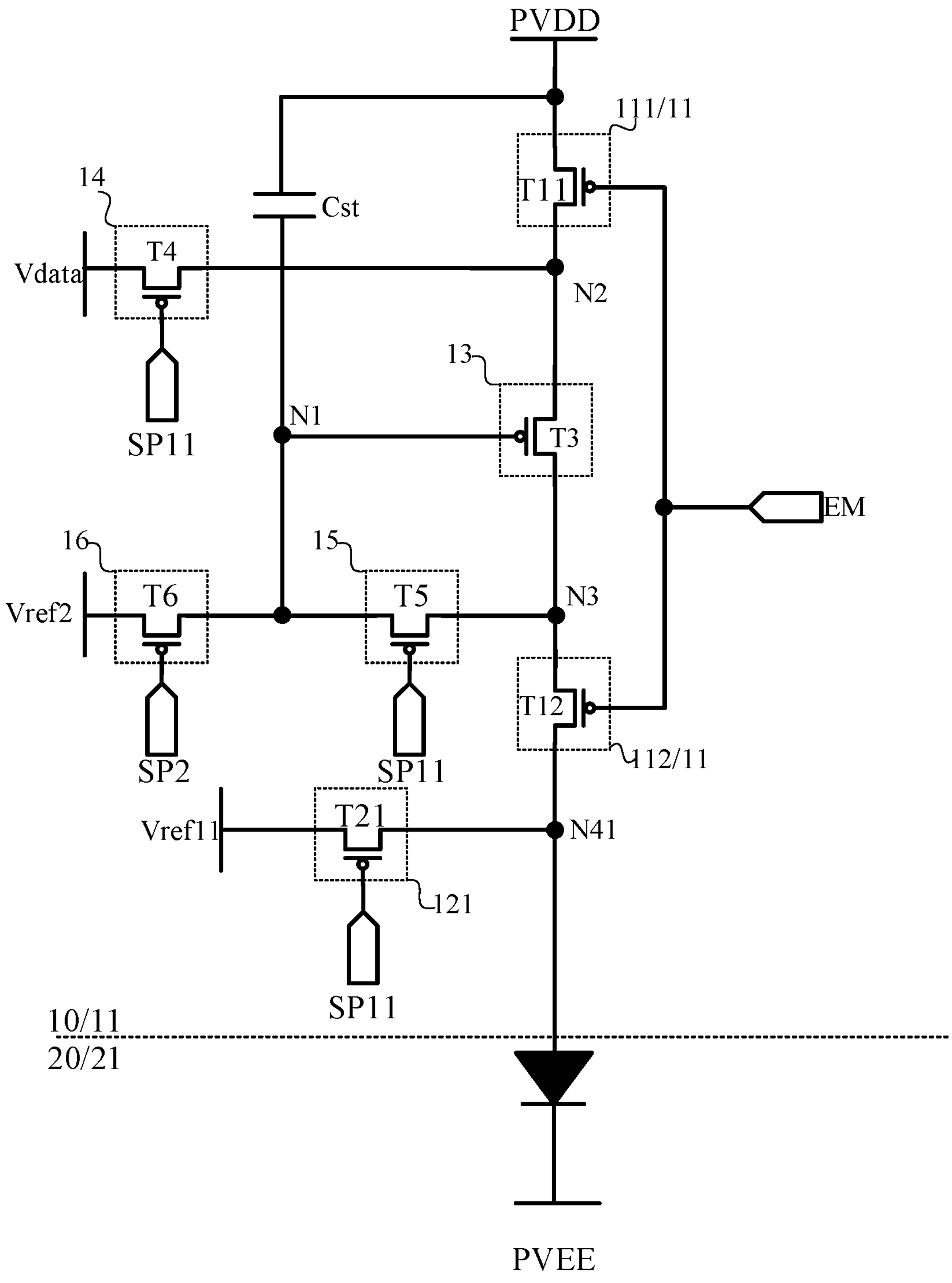
FIG. 1 illustrates a schematic structural diagram of a pixel circuit in a display panel according to various embodiments of the present disclosure.

The features and exemplary embodiments of various aspects of the present disclosure will be described in detail below. The present disclosure is further detailed below in conjunction with the accompanying drawings and specific embodiments in order to provide a clearer understanding of the objects, technical solutions and advantages of the present disclosure. It should be understood that the specific embodiments described herein are only configured to explain the present disclosure and not to limit the present disclosure. However, it is obvious to those skilled in the art that the present disclosure may be implemented without some of these specific details. The following description of the embodiments is only to provide a better understanding of the present disclosure by showing embodiments of the present disclosure.

It should be noted that in this disclosure, relational terms, such as first and second, are only used to distinguish one entity or operation from another entity or operation, and do not necessarily require or imply one of these entities or operations to have any such actual relationship or order between. Moreover, the terms "include", "containing" or any other variants thereof are intended to cover non-exclusive inclusion, such that a process, method, article or device including a series of elements not only includes those elements, but also includes those that are not explicitly listed, or also include elements inherent to this process, method, article or equipment. If there are no more restrictions, the elements defined by the sentence "including . . . " do not exclude the existence of other identical elements in the process, method, article, or equipment that includes the elements.

The term "and/or" used in this disclosure is only an association relationship describing associated objects, indicating that there may be three types of relationships. For example, A and/or B may mean that A alone exists, and both A and B exist at the same time and B exists alone. In addition, the character "/" in this text generally indicates that the associated objects before and after are in an "or" relationship.

In the embodiments of the present disclosure, the term "electrical connection" may refer to the direct electrical connection of two components or may refer to the electrical connection between the two components via one or more other components.

It is obvious to those skilled in the art that various modifications and changes may be made in this disclosure without departing from the spirit or scope of this disclosure. Therefore, this disclosure intends to cover the amendments and changes of this application that fall within the scope of the corresponding claims (claimed technical solutions) and their equivalents. It should be noted that the implementation manners provided in the embodiments of the present disclosure may be combined with each other if there is no contradiction.

Before describing the technical solutions provided by the embodiments of the present disclosure, to facilitate the understanding of the embodiments of the present disclosure, the present disclosure first specifically explains the problems existing in the related technologies: as mentioned above, in the existing technology, in the low brightness mode, when display panels switch between black and white images, the white images have a color cast phenomenon.

In order to solve the technical problem mentioned above, the applicant of the present disclosure first investigated the root cause of the technical problem mentioned above. The specific investigation process is as follows:

A display panel may be provided with a pixel circuit to drive a light-emitting element to emit light. Specifically, a driving transistor in the pixel circuit may generate a driving current according to the data signal it receives, thereby driving the light-emitting element to emit light. However, due to the hysteresis effect of the driving transistor, the driving current of the light-emitting element in the first frame is low, and the white screen cannot reach normal brightness in the first frame. The applicant also found that the anode and cathode of the light-emitting element are equivalent to two plates of a capacitor, and the organic material of the light-emitting element is equivalent to the medium between the two plates of the capacitor. The organic materials of different light-emitting elements are different. In other words, the capacitance of different light-emitting elements is different. The greater the capacitance of the light-emitting element, the greater the influence of the change of the driving current on it. For example, the capacitance of the organic material of the light-emitting element G that emits green light is the largest, and the change of the driving current in the first frame has the greatest impact on the light-emitting element G, causing the light-emitting element G to have the lowest brightness in the first frame. This causes a phenomenon in which the color of the white screen is purplish.

In view of the above findings, the embodiments of the present disclosure provide a display panel, a driving circuit and a display device, which facilitate ameliorating the color cast phenomenon of display panels. The technical solutions in the embodiments of the present disclosure will be clearly described with reference to the accompanying drawings.

FIG. 1 illustrates a schematic structural diagram of a pixel circuit in a display panel according to various embodiments of the present disclosure. As illustrated in FIG. 1, the display panel may include a pixel circuit 10 and a light-emitting element 20. The light-emitting element 20 includes, but is not limited to, an organic light-emitting diode (OLED).

The pixel circuit 10 may include a light emission control module 11. The light emission control module 11 may turn on or off under the control of the light emission control signal EM. The light emission control module 11 may receive the light emission control signal EM through the light emission control signal line. The light emission control signal EM may include valid pulses and invalid pulses. When the light emission control signal EM is a valid pulse, the light emission control signal EM may control the light emission control module 11 to turn on, and then the driving current may be transmitted to the light-emitting element 20 to make the light-emitting element 20 emit light. When the light emission control signal EM is an invalid pulse, the light emission control signal EM may control the light emission control module 11 to turn off. In the present disclosure, the valid pulse of the light emission control signal EM is at a low level and the invalid pulse of the light emission control signal EM is at a high level, which should be understood as an example for illustration purposes but not for limitation of the present disclosure.

In some embodiments, the light emission control module 11 may include a first light emission control module 111 and a second light emission control module 112. The first light emission control module 111 may include a transistor T11, and the second light emission control module 112 may include a transistor T12. The gates of the transistor T11 and the transistor T12 may receive the light emission control signal EM. The light emission control signal EM is a pulse signal, and the transistor T11 and the transistor T12 are controlled to turn on or off by the high or low level of the pulse signal.

The pixel circuit 10 may include a first pixel circuit 11, and the light-emitting element 20 may include a first light-emitting element 21 that emits light of a first color. The first pixel circuit 11 drives the first light-emitting element 21 to emit light. In some embodiments, the first light-emitting element 21 may be a light-emitting element G that emits green light.

The first pixel circuit 11 may include a first reset module 121, and the first reset module 121 may be electrically connected to the anode of the first light-emitting element 21 at a node N4. The first reset module 121 may turn on or off under the control of the first scan signal SP11. When the first scan signal SP11 controls the first reset module 121 to turn on, the first reset module 121 may transmit a first reset signal Vref11 to the anode of the first light-emitting element 21 to reset the first light-emitting element 21.

The first scan signal SP11 may include valid pulses and invalid pulses. When the first scan signal SP11 is a valid pulse, the first scan signal SP11 may control the first reset module 121 to turn on, and then the first reset signal Vref11 may be transmitted to the anode of the first light-emitting element 21 to reset the first light-emitting element 21. When the first scan signal SP11 is an invalid pulse, the first scan signal SP11 may control the first reset module 121 to turn off. In the present disclosure, the valid pulse of the first scan signal SP11 is at a low level and the invalid pulse of the first scan signal SP11 is at a high level, which should be understood as an example for illustration purposes but not for limitation of the present disclosure.

In some embodiments, the first reset module 121 may include a second transistor T21. The gate of the second transistor T21 may receive the first scan signal SP11, the first electrode of the second transistor T21 may receive the first reset signal Vref11, and the second electrode of the second transistor T21 may be electrically connected to the anode of the first light-emitting element 21 at the node N4. The first scan signal SP11 is a pulse signal, and the second transistor T21 is controlled to turn on or off by the high or low level of the pulse signal.

As illustrated in FIG. 1, the pixel circuit 10 may further include a driving module 13, a data writing module 14, a threshold compensation module 15, an initialization module 16 and a storage capacitor Cst. The driving module 13 may include a third transistor T3, the data writing module 14 may include a fourth transistor T4, the threshold compensation module 15 may include a fifth transistor T5, and the initialization module 16 may include a sixth transistor T6. PVDD represents the first power signal, and PVEE represents the second power signal. Refer to FIG. 1 for the specific connections of each module and each component, details of which will not be described herein again.

Refer continuously to FIG. 1, the data writing module 14 may turn on or off under the control of the first scan signal SP11. When the data writing module 14 is turned on, a data signal Vdata is transmitted through the data writing module 14 to a node N2. The threshold compensation module 15 may also turn on or off under the control of the first scan signal SP11. When the threshold compensation module 15 is turned on, the data signal Vdata at the node N2 is transmitted to a node N1, and the threshold compensation module 15 compensates the threshold voltage of the third transistor T3. The initialization module 16 may turn on or off under the control of a scan signal SP2. When the initialization module 16 is turned on, an initialization signal Vref2 is transmitted to the node N1 to initialize the gate of the third transistor T3. Optionally, the absolute value of the voltage of the initialization signal Vref2 is smaller than the absolute value of the voltage of the first reset signal Vref11. At this moment, the display panel may have better data writing and anode reset effects.

When the light-emitting element 20 enters the light-emitting stage, the driving module 12 of the pixel circuit 10 may provide a corresponding driving current to the light-emitting element 20 according to the data signal it receives, so that the light-emitting element 20 emits light. The brightness of the light-emitting element 20 may be related to the driving current provided by the driving module 13.

Figure 2:
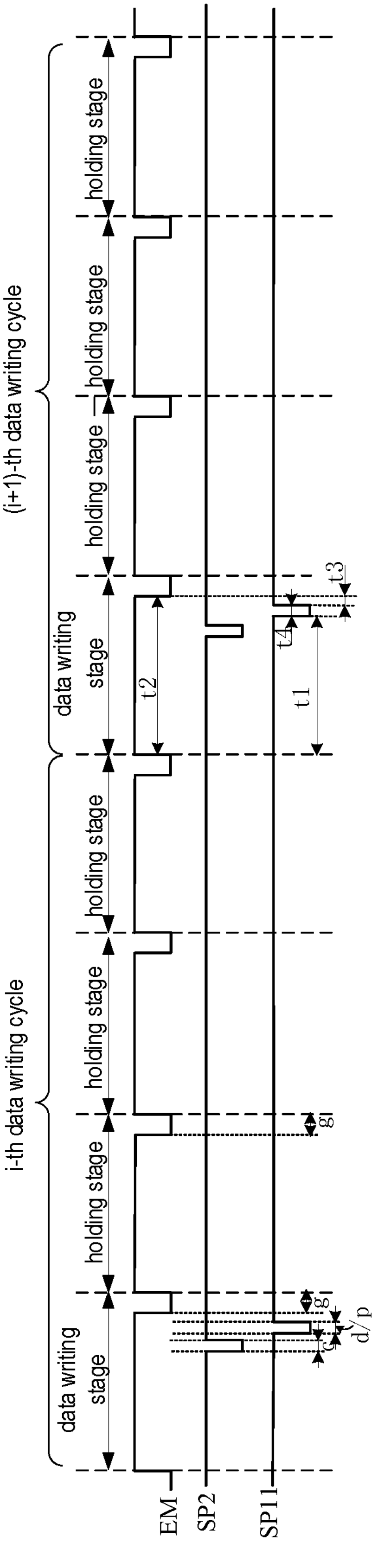
FIG. 2 illustrates a timing diagram of the pixel circuit in FIG. 1.

Referring to FIG. 1 and FIG. 2, the working process of the pixel circuit may include multiple data writing cycles. Each data writing cycle may include a data writing phase and m holding phases. In the data writing phase, the first scan signal SP11 may include at least one first valid pulse. The light emission control signal EM includes one second valid pulse in the data writing phase and each holding phase. Exemplarily, in the data writing phase, the first scan signal SP11 may further include an invalid pulse. In the data writing phase and each holding phase, the light emission control signal EM may further include an invalid pulse.

The working modes of the display panel include a first mode. In the first mode, the interval between the start time of the first valid pulse in the (i+1)-th data writing cycle and the end time of the last second valid pulse in the i-th data writing cycle is t1. In the data writing phase, the duration of the light emission control signal EM being an invalid pulse is t2, $$\frac{t1}{t2} \geq 1\%, m \geq 1, i \geq 1,$$

and m and i are integers.

It should be noted that the working modes of the display panel mentioned in the embodiments of the present disclosure include the first mode, and besides the first mode, the display panel may also include other modes, and different modes may be applied in different application scenarios. In different modes, the display panel may have different brightness. For example, when the external ambient light is strong, the display brightness presented by the display panel may be greater than the display brightness presented by the display panel when the external ambient light is weak, and when the display panel displays a white image, the display brightness may be greater than when the display panel displays a black image.

Exemplarily, the first mode may be a low brightness mode. In order to understand the first mode more intuitively, take the display panel including a brightness control bar as an example, where different positions on the brightness control bar represent different brightness levels. When the display panel displays a same grayscale picture, when the brightness control bar is pulled to the highest position, that is, when the brightness level is at the highest level, the display brightness presented by the display panel is the maximum brightness. When the brightness control bar is pulled to the lowest position, that is, when the brightness level is at the lowest level, the display brightness presented by the display panel is the minimum brightness. The first mode may be at a low brightness level position. The brightness of the display panel in the first mode is relatively low. Exemplarily, the brightness of the display panel in the first mode may be 2 nit, or other low brightness levels.

It should be understood that, under each brightness level, the display panel may display a 0-255 picture grayscale. Optionally, when the display panel includes a larger grayscale, more picture grayscales may be displayed under each brightness level.

In addition, the dimming method of the display panel may include a power modulation dimming mode and a pulse width modulation dimming mode. The power modulation dimming mode may be referred to as DC dimming, and the pulse width modulation dimming mode may be referred to as PWM dimming. When adjusting the brightness using the power modulation dimming mode, the duty cycle of the light emission control signal EM is kept constant, and the required target brightness is achieved by adjusting the voltage value of the data signal. When adjusting the brightness using the pulse width modulation dimming mode, the required target brightness is achieved by adjusting the duty cycle of the light emission control signal EM. The duty cycle of the light emission control signal EM may be equal to the ratio of the invalid pulse duration to the valid pulse duration of the light emission control signal EM. In the first mode, the display panel may adopt the PWM dimming.

It should be noted that m=3 is only used for illustration purposes but not for limitation of the present disclosure.

The data writing cycle may be determined by the minimum cycle in which the data signal Vdata is written into the gate of the third transistor T3. In one data writing cycle, the data signal Vdata may be written into the gate of the third transistor T3 once.

The data writing phase may include a data writing sub-phase d. In the data writing sub-phase d, the data writing module 14 and the threshold compensation module 15 may be turned on, and the data signal Vdata may be written into the gate of the third transistor T3. The holding phase does not include the data writing sub-phase d, and in the holding phase, the data signal Vdata is not written into the gate of the third transistor T3.

In some embodiments, with reference to FIG. 1 and FIG. 2, the data writing phase may include a reset sub-phase p, in which the first valid pulse of the first scan signal SP11 is at a low level, the first reset module 121 is turned on, the first reset signal Vref11 is written into the anode of the first light-emitting element 21, and the anode of the first light-emitting element 21 is reset. The data writing module 14, the threshold compensation module 15 and the first reset module 121 may all be controlled by the first scan signal SP11, and the data writing sub-phase d and the reset sub-phase p may overlap in time.

In addition, the data writing phase may also include an initialization sub-phase c. In the initialization sub-phase c, the scan signal SP2 is at a low level, the initialization module 16 is turned on, and the initialization signal Vref2 is transmitted to the node N1 to initialize the gate of the transistor T3.

Figure 3:
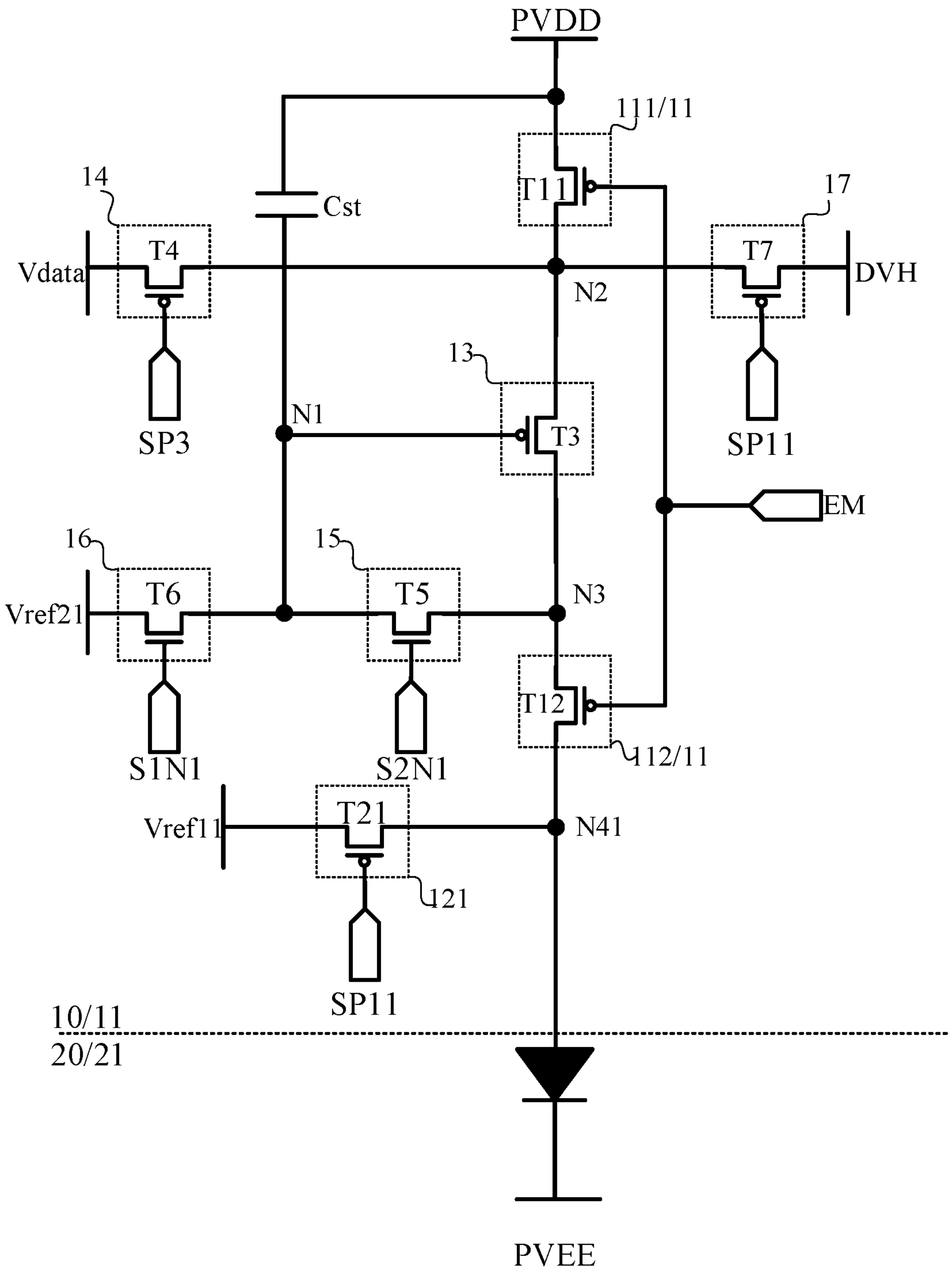
FIG. 3 illustrates another schematic structural diagram of a pixel circuit in a display panel according to various embodiments of the present disclosure.

In some embodiments, as illustrated in FIG. 3, the pixel circuit may further include a bias module 17. The bias module 17 may turn on or off under the control of the first scan signal SP11. When the bias module 17 is turned on, the bias signal DVH is transmitted to a node N2 through the bias module 17. In some embodiments, the bias module 17 may be connected to a node N3. In some embodiments, the control signal of the bias module 17 may be different from the first scan signal SP11.

The difference between FIG. 3 and FIG. 2 is that the data writing module 14 is turned on or off under the control of the scan signal SP2, the threshold compensation module 15 is turned on or off under the control of the scan signal S2N1, and the initialization module 16 is turned on or off under the control of the scan signal S1N1.

Figure 4:
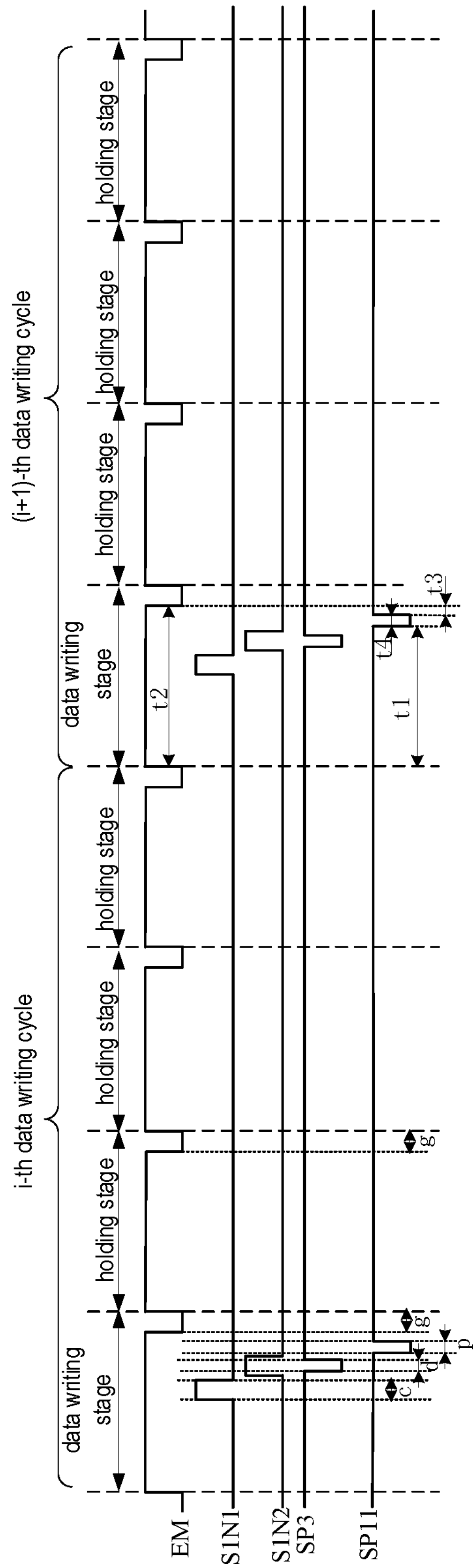
FIG. 4 illustrates a timing diagram of the pixel circuit in FIG. 3.

Referring to FIG. 3 and FIG. 4, in the initialization sub-phase c, the scanning signal S1N1 is at a high level, the initialization module 16 is turned on, and the initialization signal Vref2 is transmitted to the node N1 to initialize the gate of the third transistor T3.

In the data writing sub-phase d, the scanning signal SP2 is at a low level, the data writing module 14 is turned on, the scan signal S2N1 is at a high level, the threshold compensation module 15 is turned on, the data signal Vdata is written into the gate of the third transistor T3 and compensates the threshold voltage of the third transistor T3.

In the reset sub-phase p, the first valid pulse of the first scan signal SP11 is at a low level, the first reset module 121 is turned on, and the first reset signal Vref11 is written into the anode of the first light-emitting element 21 to reset the anode of the light-emitting element 21. In addition, in the reset sub-phase p, the bias module 17 is turned on, and the bias signal is written into the node N2 and the node N3, so as to adjust the bias state of the third transistor T3.

In the embodiments illustrated in FIG. 3 and FIG. 4, the data writing sub-phase d and the reset sub-phase p do not need to overlap in time.

Referring to FIG. 1 and FIG. 2, or referring to FIG. 3 and FIG. 4, in the data writing phase and in each holding phase, a light-emitting sub-phase g may be included. In the light-emitting sub-phase g, the light emission control signal EM is a valid pulse (e.g., the light emission control signal EM is at a low level), the light emission control module 11 is turned on, the driving current generated by the driving module 13 is transmitted to the light-emitting element 20, and the light-emitting element 20 emits light.

Figure 5:
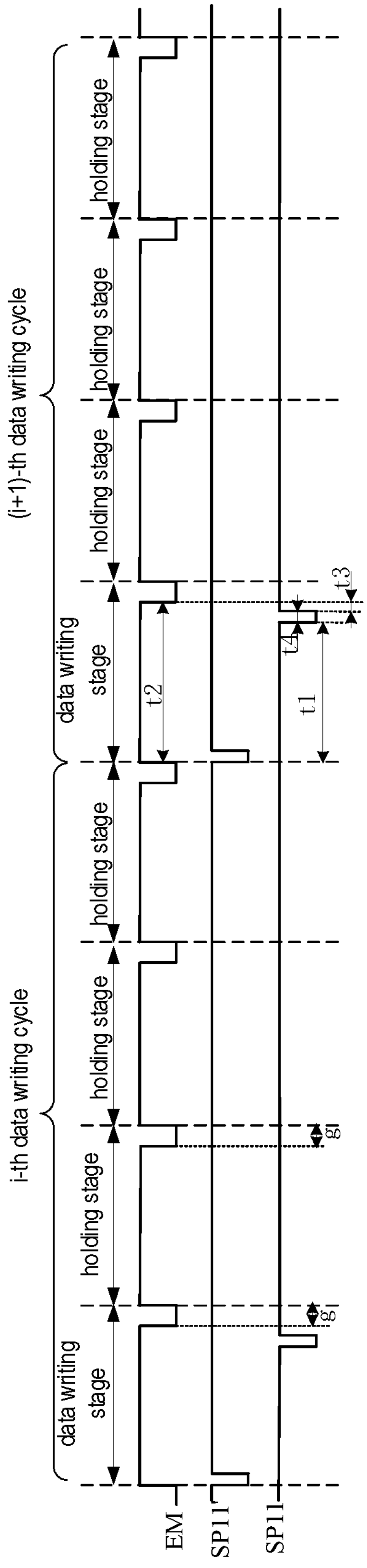
FIG. 5 illustrates a timing diagram of a comparative example of FIG. 2.

In order to better understand the beneficial effects of the display panel provided by the embodiments of the present disclosure, refer to FIG. 5 for further illustration. The difference between FIG. 5 and FIG. 2 is that, when the scan signal SP11' is at a low level, the first reset signal may reset the anode of the first light-emitting element. As illustrated in FIG. 5, after the end of the light-emitting sub-phase g of the last holding phase of the i-th data writing cycle, the scan signal SP11' jumps to a low level immediately, the first light-emitting element is immediately reset, and the first light-emitting element stops emitting light.

Figure 6:
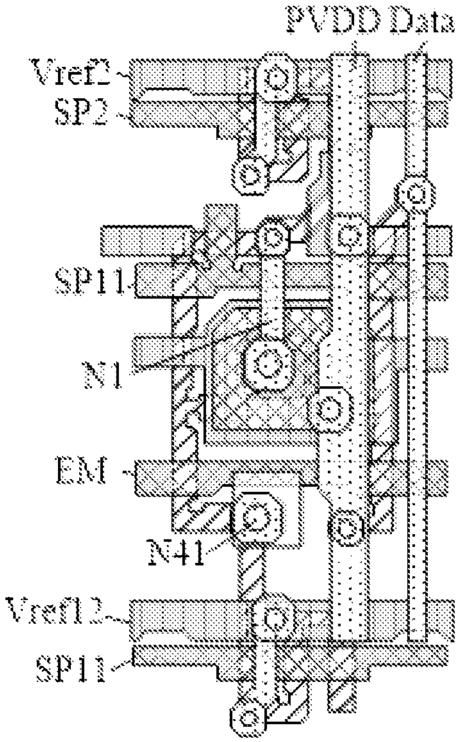
FIG. 6 illustrates a schematic diagram of a layout structure of a pixel circuit in a display panel according to various embodiments of the present disclosure.

In order to better compare the first scan signal SP11 and the scan signal SP11' in the embodiments of the present disclosure, the timing of the two is illustrated in FIG. 5. It can be seen that, according to the display panel provided by the embodiments of the present disclosure, since $$\frac{t1}{t2} \geq 1\%,$$

when the relative positions of the first scan signal SP11 and the light emission control signal EM are shifted, the valid pulse of the first scan signal SP11 is shifted back by a duration t1 relative to the light emission control signal EM. After the end of the light-emitting sub-phase g of the last holding phase of the i-th data writing cycle, the light emission control signal EM jumps from a low level to a high level. As illustrated in FIG. 6, a parasitic capacitance is formed between the light emission control signal line for transmitting the light emission control signal EM and/or the transistor controlled by the light emission control signal EM and the anode of the first light-emitting element (i.e., the anode connected to a node N41, which is not illustrated in FIG. 6). The light emission control signal EM jumps from a low level to a high level. Through the coupling effect, the anode potential of the first light-emitting element rises. Therefore, after the light-emitting sub-phase g of the last holding phase of the i-th data writing cycle, the anode of the first light-emitting element will discharge, making the first light-emitting element continue to emit light. This is equivalent to increasing the brightness of the last light-emitting sub-phase g of the i-th data writing cycle, which facilitates ameliorating the color cast phenomenon.

Figure 7:
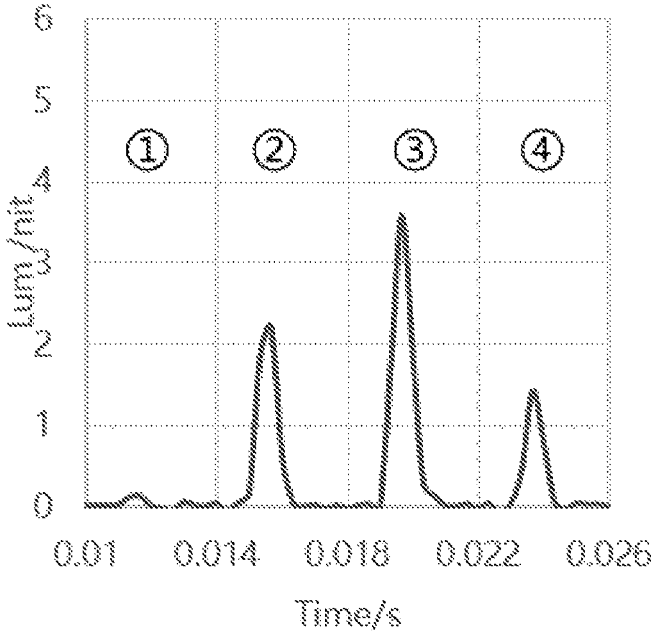
FIG. 7 illustrates a schematic diagram of the brightness of a display panel shown in a comparative example.
Figure 8:
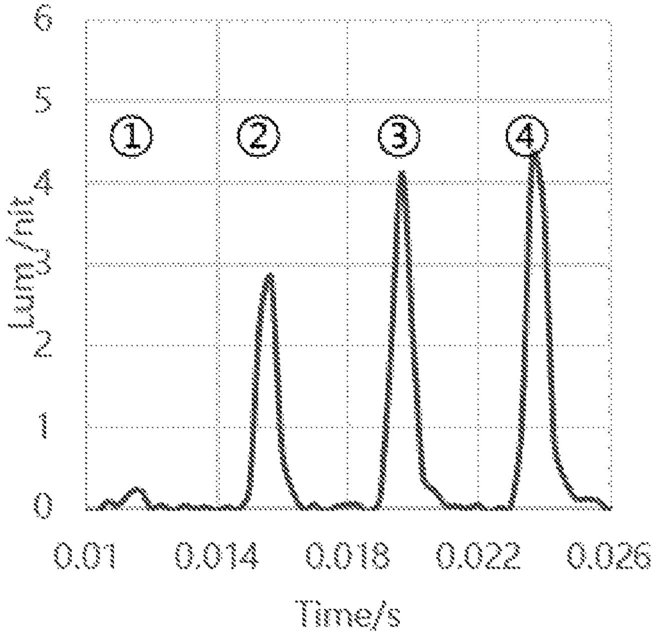
FIG. 8 illustrates a schematic diagram of the brightness of a display panel according to various embodiments of the present disclosure.

The applicant also verified the beneficial effects of the solution provided by the embodiments of the present disclosure. In FIG. 7 and FIG. 8, the horizontal axis represents time, and the vertical axis represents brightness. FIG. 7 is the brightness condition under the control of the scanning signal SP11', and FIG. 8 is the brightness condition under the control of the first scanning signal SP11. In the figures, the serial numbers ①, ②, ③, and ④ respectively correspond to the brightness of one data writing phase and three holding phases of the i-th data writing cycle. It can be seen that, according to the embodiments of the present disclosure, the display brightness in the last holding stage of the i-th data writing cycle may be significantly improved.

In the embodiments of the present disclosure, the i-th data writing cycle may correspond to the first frame image, so the embodiments of the present disclosure may effectively improve the brightness of the first frame image.

It should be understood that the larger t1, the greater the degree of the relative shift back of the first valid pulse of the first scan signal SP11. After the light-emitting sub-phase g of the last holding phase of the i-th data writing cycle, the anode discharge time of the first light-emitting element is longer, so that the time for the first light-emitting element to continue to emit light is longer, which is more beneficial to ameliorating the color cast phenomenon.

It should be noted that, in some embodiments, the display panel may further include a gate driving circuit. The gate driving circuit is configured to provide the first scan signal mentioned above and in the following embodiments. In other embodiments, the first scan signal may also be provided by other structures.

Exemplarily, the light emission control signal and the first scan signal may be generated by different gate driving circuits.

In some embodiments, $$\frac{t1}{t2} \geq 50\%.$$

In some embodiments, in the first mode, the interval between the end time of the first valid pulse in the (i+1)-th data writing cycle and the start time of the first second valid pulse in the (i+1)-th data writing cycle is t3, and t1>t3.

It may be understood that, compared with SP11' illustrated in FIG. 5, in the above two embodiments, the first valid pulse of the first scan signal SP11 is shifted back by at least half of t2, which relatively increases the degree of the shift back of the first valid pulse of the first scan signal SP11.

In some embodiments, t3=0. At this moment, the first valid pulse of the first scan signal SP11 may be shifted back maximally. That is, after the light-emitting sub-phase g of the last holding phase of the i-th data writing cycle, the anode discharge duration of the first light-emitting element may be maximized, and the time for the first light-emitting element to continue to emit light is maximized, which is most beneficial to ameliorating the color cast phenomenon.

In some embodiments, in order to prevent the first scan signal SP11 and the light emission control signal EM from jumping at the same time, t3 may also be greater than 0. In this way, the interference between the first scan signal SP11 and the light emission control signal EM may be reduced, or a relatively large interference between the first scan signal SP11 and the light emission control signal EM on other components may be reduced.

The applicant further investigated and found that there is a relatively good effect of reducing interference when t3 is greater than or equal to 0.5H.

Here, $$H = \frac{1}{F \times n},$$

n is the number of rows of pixel circuit, F is the refresh rate of the display panel in the first mode. The refresh rate may be the frequency at which the data signal Vdata refreshes the gate potential of the third transistor T3. When the data signal Vdata is written into the gate of the third transistor T3 once, the data signal Vdata refreshes the potential of the gate of the third transistor T3 once. Here, the refresh rate F may be the reciprocal of the data writing cycle.

In order to make the first scan signal SP11 have enough time and space to shift back, in some embodiments, as illustrated in FIG. 2, the duration of the first valid pulse of the first scan signal SP11 is t4, $$\frac{t2}{t4} \geq 10.$$

In some embodiments, in the first mode, the ratio of the second valid pulse to the invalid pulse of the light emission control signal EM may be 2:98. In other words, the duty cycle of the invalid pulse of the light emission control signal EM may be 98%. At this moment, in the first mode, the display panel has a relatively low brightness.

Figure 9:
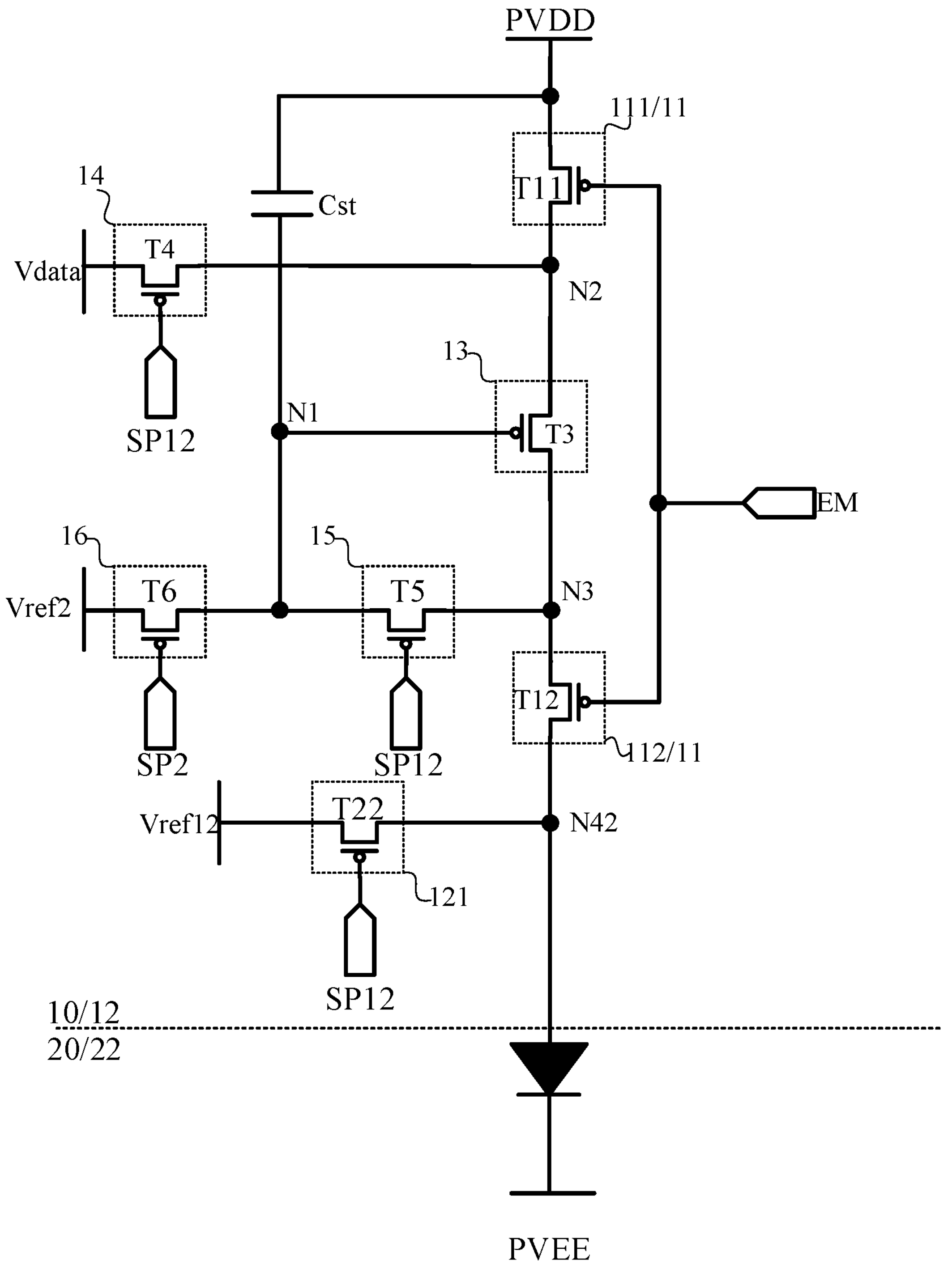
FIG. 9 illustrates another schematic structural diagram of a pixel circuit in a display panel according to various embodiments of the present disclosure.

In some embodiments, as illustrated in FIG. 9, the pixel circuit 10 may further include a second pixel circuit 12, and the light-emitting element 20 may include a second light-emitting element 22 that emits light of a second color. The second pixel circuit 12 drives the second light-emitting element 22 to emit light. In some embodiments, the second light-emitting element 22 may be a light-emitting element R that emits red light or a light-emitting element B that emits blue light.

The second pixel circuit 12 includes a second reset module 122, and the second reset module 122 may be electrically connected to the anode of the second light-emitting element 22 at a node N42.

The similarity between FIG. 9 and FIG. 1 is not repeated herein again. The difference between FIG. 9 and FIG. 1 is that the second reset module 122 may turn on or off under the control of the second scan signal SP12. When the second scan signal SP12 controls the second reset module 122 to turn on, the second reset module 122 transmits a second reset signal Vref 12 to the second light-emitting element 22 to reset the second light-emitting element 22.

Exemplarily, the voltages of the first reset signal Vref11 and the second reset signal Vref12 may be the same or may be set to be different according to the characteristics of the first light-emitting element and the second light-emitting element.

The second scan signal SP12 may include valid pulses and invalid pulses. When the second scan signal SP12 is a valid pulse, the second scan signal SP12 may control the second reset module 122 to turn on, so that the second reset signal Vref12 is transmitted to the anode of the second light-emitting element 22 to reset the second light-emitting element 22. When the second scan signal SP12 is an invalid pulse, the second scan signal SP12 may control the second reset module 122 to turn off. In the present disclosure, the valid pulse of the second scan signal SP12 is at a low level and the invalid pulse of the second scan signal SP12 is at a high level as an example for illustration and does not limit the present disclosure.

In some embodiments, the second reset module 122 may include a transistor T22. The gate of the transistor T22 may receive the second scan signal SP12, the first electrode of the transistor T22 may receive the second reset signal Vref12, and the second electrode of the transistor T22 may be electrically connected to the anode of the second light-emitting element 22 at the node N42. The second scan signal SP12 is a pulse signal, and the transistor T22 is controlled to turn on or off by the high or low level of the pulse signal.

Figure 10:
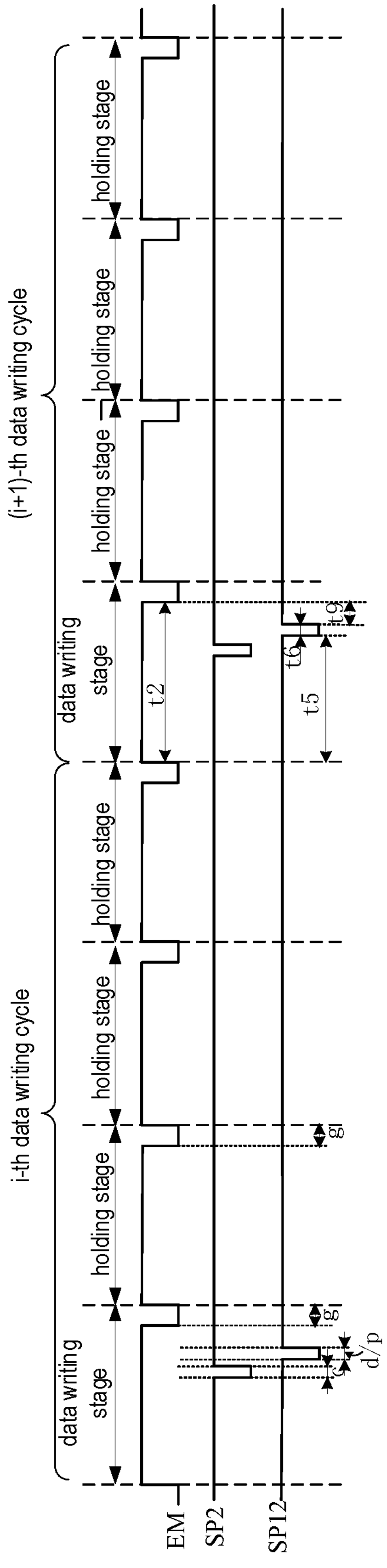
FIG. 10 illustrates a timing diagram of the pixel circuit in FIG. 9.

Refer to FIG. 9 and FIG. 10, in the data writing phase, the second scan signal SP12 may include at least one third valid pulse. In the first mode, the interval between the start time of the first third valid pulse in the (i+1)-th data writing cycle and the end time of the last second valid pulse in the i-th data writing cycle is t5, t1≠t5.

Since the characteristics of the first light-emitting element and the second light-emitting element are different (e.g., the organic materials of the two light-emitting elements are different), the capacitances of the two light-emitting elements may be also consequentially different. By setting t1 to be not equal to t5, according to the characteristics of the first light-emitting element and the second light-emitting element, the degrees to which the valid pulses of the first scan signal SP11 and the second scan signal SP12 (which correspond to the two elements, respectively) shift back may be set to be different. This helps match the brightness ratio of the two elements, thereby facilitating the amelioration of the color cast phenomenon.

In some embodiments, the capacitance of the first light-emitting element is greater than the capacitance of the second light-emitting element. As introduced above, the greater the capacitance of the light-emitting element, the greater the impact of the change of the driving current on the light-emitting element. At this moment, t1 may be greater than t5. Accordingly, the relative shift back degree of the first valid pulse of the first scan signal SP11 may be greater than the relative shift back degree of the first valid pulse of the second scan signal SP12, which is more beneficial to improving the brightness of the first light-emitting element, thereby facilitating amelioration of the color cast phenomenon.

In some embodiments, as illustrated in FIG. 2, the duration of the first valid pulse of the first scan signal SP11 is t4, and as illustrated in FIG. 10, the duration of the third valid pulse of the second scan signal SP12 is t6, t4 may be equal to t6. In this way, the reset durations of the first light-emitting element 21 and the second light-emitting element 22 are equal, thereby facilitating display uniformity.

In some embodiments, $$\frac{t5}{t2} \geq 50\%.$$

In some embodiments, as shown in FIG. 10, the interval between the end time of the first third valid pulse in the (i+1)-th data writing cycle and the start time of the first second valid pulse in the (i+1)-th data writing cycle is t9, t5>t9.

In some embodiments, t9=0.

In some embodiments, t9>0. For example, t9≥0.5H, n represents the number of rows of pixel circuit, and F is the refresh rate of the display panel in the first mode.

Figure 11:
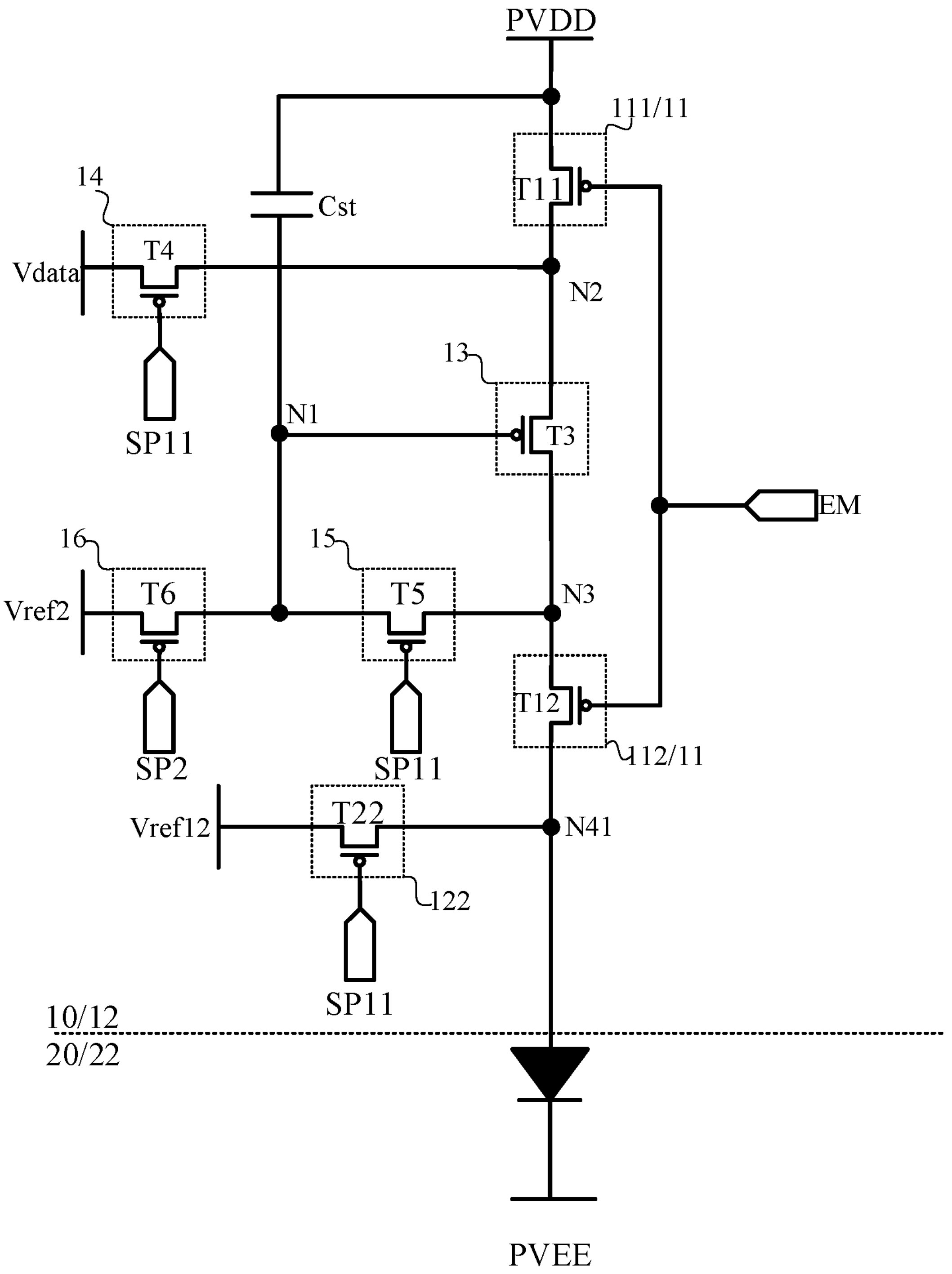
FIG. 11 illustrates another schematic structural diagram of a pixel circuit in a display panel according to various embodiments of the present disclosure.

In some embodiments, as illustrated in FIG. 11, the pixel circuit 10 may further include a second pixel circuit 12, and the light-emitting element 20 may include a second light-emitting element 22 that emits light of a second color. The second pixel circuit 12 drives the second light-emitting element 22 to emit light. In some embodiments, the second light-emitting element 22 may be a light-emitting element R that emits red light or a light-emitting element B that emits blue light.

The similarity between FIG. 11 and FIG. 9 is not to be repeated herein again. The difference between FIG. 11 and FIG. 9 is that the second reset module 122 may turn on or off under the control of the first scan signal SP11. When the first scan signal SP11 controls the second reset module 122 to turn on, the second reset module 122 transmits the second reset signal Vref12 to the second light-emitting element 22 to reset the second light-emitting element 22.

Refer to FIG. 2 for the specific timing of the first scan signal SP11 in FIG. 11, the detail of which is not described herein again.

Optionally, in the embodiments of the present disclosure, the first reset module 121 and the second reset module 122 may be controlled by the same first scan signal SP11, so that at least the first pixel circuit and the second pixel circuit in the same row may be connected to the same scan line. This facilitates improving the resolution of the display panel. In addition, the anode reset of the light-emitting element R, light-emitting element G, and light-emitting element B may be set to be controlled by the same first scan signal SP11. The verification result indicates that the display brightness of the light-emitting element R, the light-emitting element G, and the light-emitting element B in the last holding phase of the i-th data writing cycle may all be improved, and the brightness of the light-emitting element G improved the most.

Figure 12:
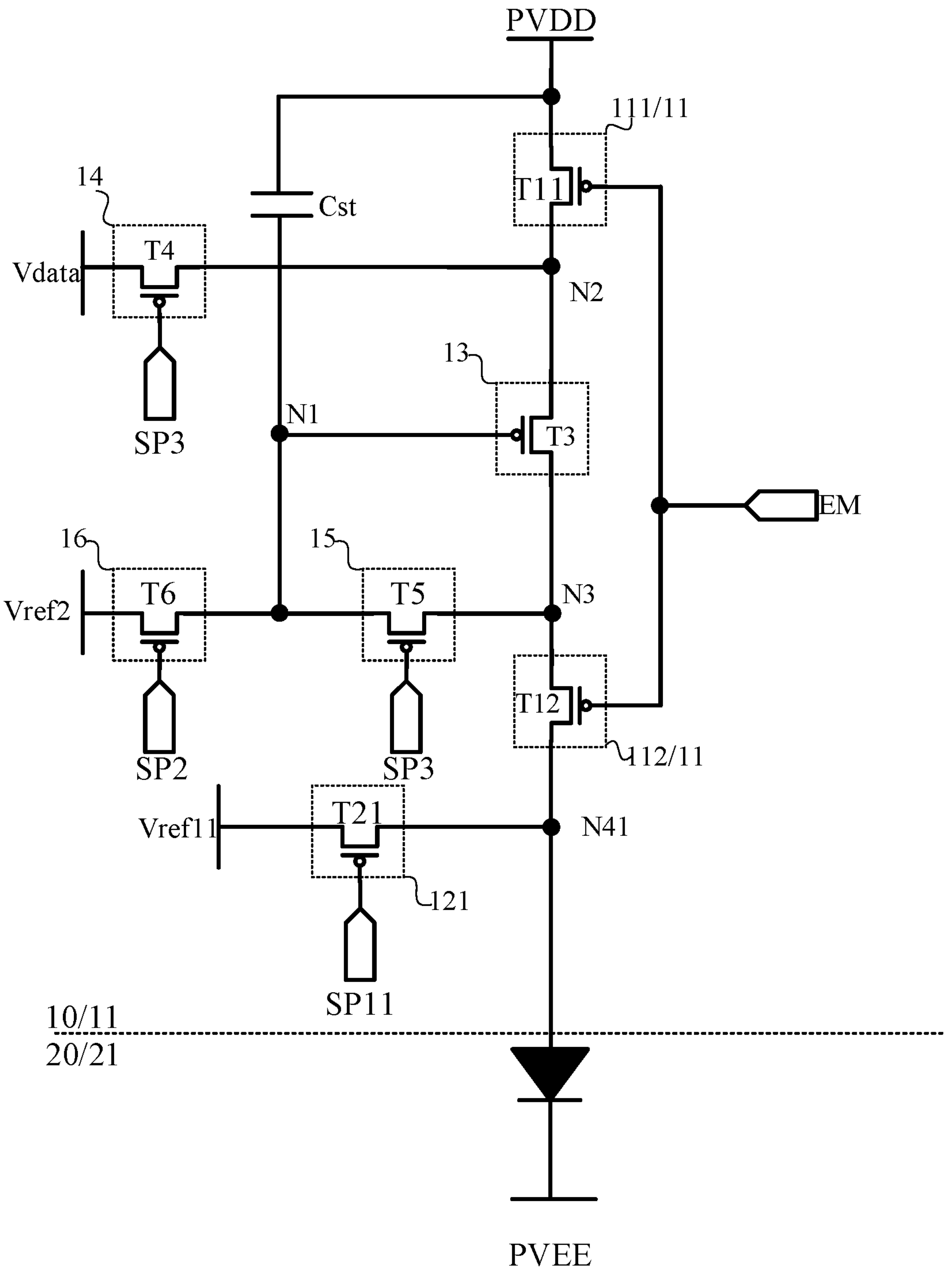
FIG. 12 illustrates another schematic structural diagram of a pixel circuit in a display panel according to various embodiments of the present disclosure.
Figure 13:
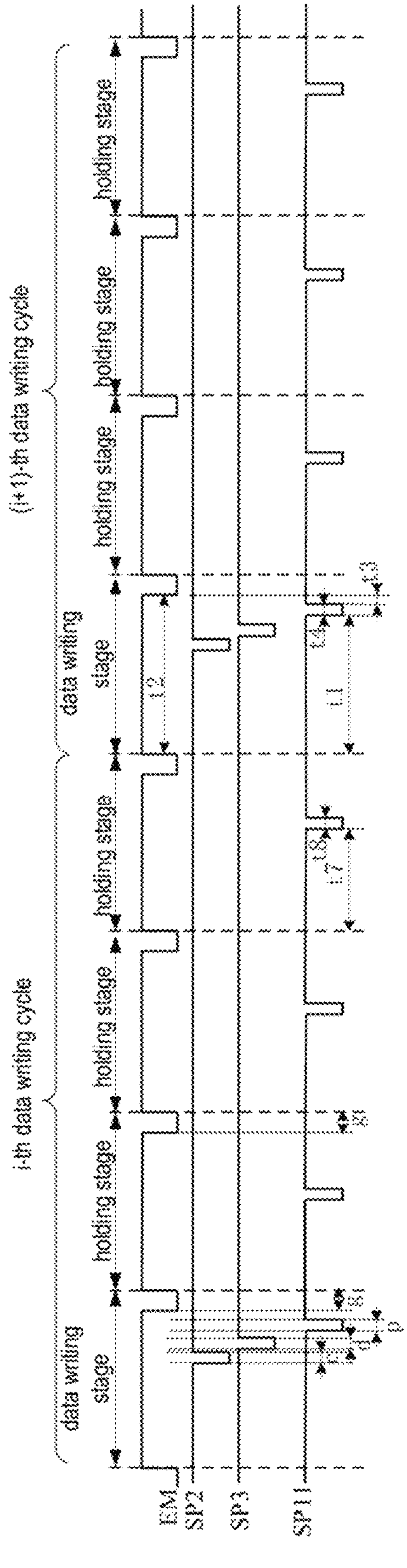
FIG. 13 illustrates a timing diagram of the pixel circuit in FIG. 12.

In some embodiments, refer to FIG. 12 and FIG. 13, the light emission control signal EM still includes one second valid pulse in both the data writing phase and the holding phases. Taking a data writing cycle including a data writing phase and m holding phases as an example, in a same data writing cycle, the light emission control signal EM has a total of m+1 second valid pulses, and the second valid pulse in the j-th holding phase is the (j+1)-th second valid pulse in that data writing cycle.

In at least one holding phase, the first scan signal SP11 may include at least one fourth valid pulse. In FIG. 13, the first scan signal SP11 includes a fourth valid pulse for each holding phase. However, the present disclosure is not limited to such configuration.

In the embodiments of the present disclosure, the anode of the first light-emitting element may also be reset during the holding phase, which may ameliorate the problem of the dark state being not dark due to the rise of the anode potential caused by the leakage current of the common layer of different light-emitting elements.

It should be noted that, the first valid pulse and the fourth valid pulse of the first scan signal SP11 mentioned in the embodiments of the present disclosure are both valid pulses. Under the control of the first valid pulse and the fourth valid pulse, the first reset module 121 is turned on, so that the first reset signal Vref11 is transmitted to the anode of the first light-emitting element 21 to reset the first light-emitting element 21.

In a same data writing cycle, the interval between the start time of the first fourth valid pulse in the j-th holding phase and the end time of the j-th second valid pulse is t7. Here, $1 \le j \le m$.

In some embodiments, t1=t7.

When t1=t7, the durations of the continuous light emission of the first light-emitting element corresponding to different holding phases in the i-th data writing cycle remain equal, so as to avoid affecting the uniformity of the display brightness corresponding to different holding phases.

It should be understood that the continuous light emission of the first light-emitting element means that: The light emission control signal EM jumps from a low level to a high level, and the anode potential of the first light-emitting element rises through coupling. Therefore, after each light-emitting sub-phase g of each holding phase of the i-th data writing cycle, the anode of the first light-emitting element will discharge, so that the first light-emitting element continues to emit light.

In some embodiments, t1≠t7.

When t1≠t7, the size relationship between t1 and t7 may be set according to different requirements. For example, in the pursuit of better suppression of leakage current, t7 may be smaller than t1. For another example, in the pursuit of improving the display brightness corresponding to one data writing cycle as a whole, t7 may be greater than t1.

Exemplarily, the duration of the first valid pulse of the first scan signal SP11 is t4, the duration of the fourth valid pulse of the first scan signal SP11 is t8, t4=t8. In this way, in the holding phases and in the data writing phase, the reset duration of the first light-emitting element is equal, which facilitates improving the display uniformity of the first light-emitting element in each light-emitting sub-phase.

Figure 14:
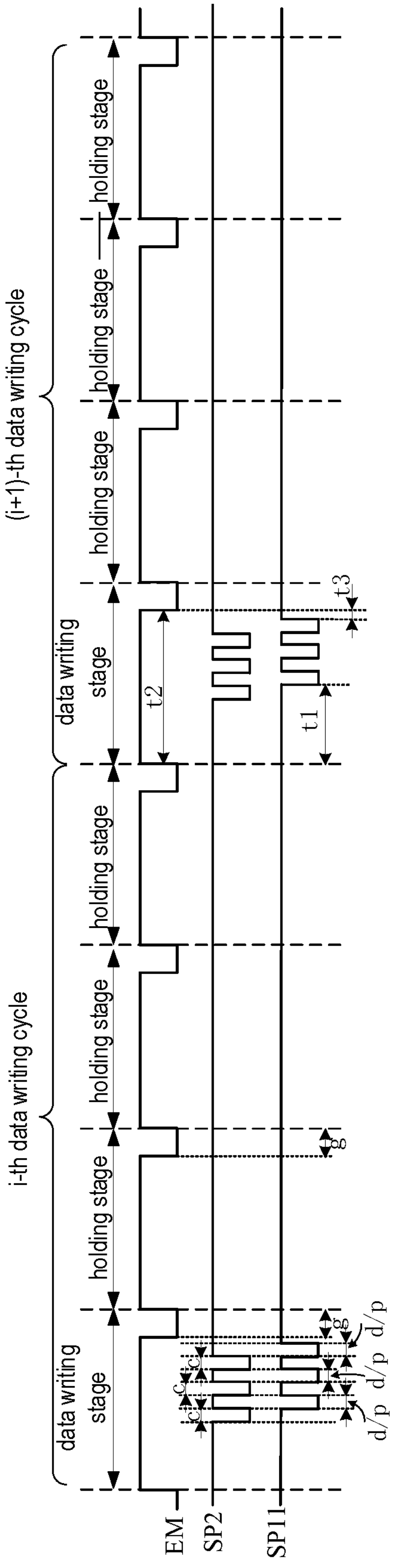
FIG. 14 illustrates another timing diagram of the pixel circuit in FIG. 1.

In some embodiments, as illustrated in FIG. 14, in the data writing phase, the first scan signal SP11 may include at least two first valid pulses. In the embodiment illustrated in FIG. 14, the first scan signal SP11 includes three first valid pulses in the data writing phase, and there are invalid pulses between adjacent first valid pulses.

The scan signal SP2 may also include a plurality of valid pulses, and in the data writing phase, the number of valid pulses of the scan signal SP2 is equal to the number of first valid pulses of the first scan signal SP11.

In the data writing phase, multiple initialization sub-phases c and multiple data writing sub-phases d may be included, where the reset sub-phase p overlaps with the data writing sub-phase d in time. Initialization sub-phase c and data writing sub-phase d alternate. In this way, before the light-emitting sub-phase g, the gate of the third transistor T3 may be repeatedly initialized, thereby solving the hysteresis effect of the third transistor T3. This further ameliorates the color cast phenomenon caused by insufficient brightness of the first frame.

Based on the same inventive concept, embodiments of the present disclosure further provide a display panel. As illustrated in FIG. 1, the display panel may include a pixel circuit 10 and a light-emitting element 20. The pixel circuit 10 may include a light emission control module 11, and the light emission control module 11 may make the light-emitting element 20 emit light under the control of the light emission control signal EM. The pixel circuit 10 may include a first pixel circuit 11, and the light-emitting element 20 may include a first light-emitting element 21 that emits light of a first color. The first pixel circuit 11 drives the first light-emitting element 21 to emit light. In some embodiments, the first light-emitting element 21 may be a light-emitting element G that emits green light.

The first pixel circuit 11 may include a first reset module 121, which may be electrically connected to the anode of the first light-emitting element 21 at the node N4. The first reset module 121 may turn on or off under the control of the first scan signal SP11. When the first scan signal SP11 controls the first reset module 121 to turn on, the first reset module 121 may transmit the first reset signal Vref11 to the anode of the first light-emitting element 21 to reset the first light-emitting element 21.

Referring to FIG. 1 and FIG. 2, the working process of the pixel circuit may include multiple data writing cycles. Each data writing cycle may include a data write phase and m holding phases. In the data writing phase, the first scan signal SP11 may include at least one first valid pulse. The light emission control signal EM includes one second valid pulse in the data writing phase and in each holding phase. Exemplarily, in the data writing phase, the first scan signal SP11 may further include invalid pulses. In the data writing phase and each holding phase, the light emission control signal EM may further include invalid pulses.

The working modes of the display panel include the first mode. In the first mode, the interval between the start time of the first valid pulse in the (i+1)-th data writing cycle and the end time of the last second valid pulse in the i-th data writing cycle is t1.

$$t1 \geq 1H, \text{ where } H = \frac{1}{F \times n},$$

n is the number of rows of pixel circuit, F is the refresh rate of the display panel in the first mode, m≥1, i≥1, and m and i are integers. The refresh rate may be the frequency at which the data signal Vdata refreshes the gate potential of the third transistor T3. When the data signal Vdata is written into the gate of the third transistor T3 once, the data signal Vdata refreshes the gate potential of the third transistor T3 once. Here, the refresh rate F may be the reciprocal of the data writing cycle.

Compared to the scan signal SP11' illustrated in FIG. 5, when t1≥1H, the relative positions of the first scan signal SP11 and the light emission control signal EM are shifted, and the valid pulse of the first scan signal SP11 is shifted back by a duration t1 relative to the light emission control signal EM. After the end of the light-emitting sub-phase g of the last holding phase of the i-th data writing cycle, the light emission control signal EM jumps from a low level to a high level. A parasitic capacitance is formed between the light-emitting control signal line for transmitting the light-emitting control signal EM and/or the transistor controlled by the light-emitting control signal EM and the anode of the first light-emitting element. The light-emitting control signal EM jumps from a low level to a high level. Through the coupling effect, the anode potential of the first light-emitting element rises. Therefore, after the light-emitting sub-phase g of the last holding phase of the i-th data writing cycle, the anode of the first light-emitting element may discharge, thereby causing the first light-emitting element to continue to emit light. This is equivalent to increasing the brightness of the last light-emitting sub-phase g of the i-th data writing cycle, which facilitates ameliorating the color cast phenomenon.

Figure 15:
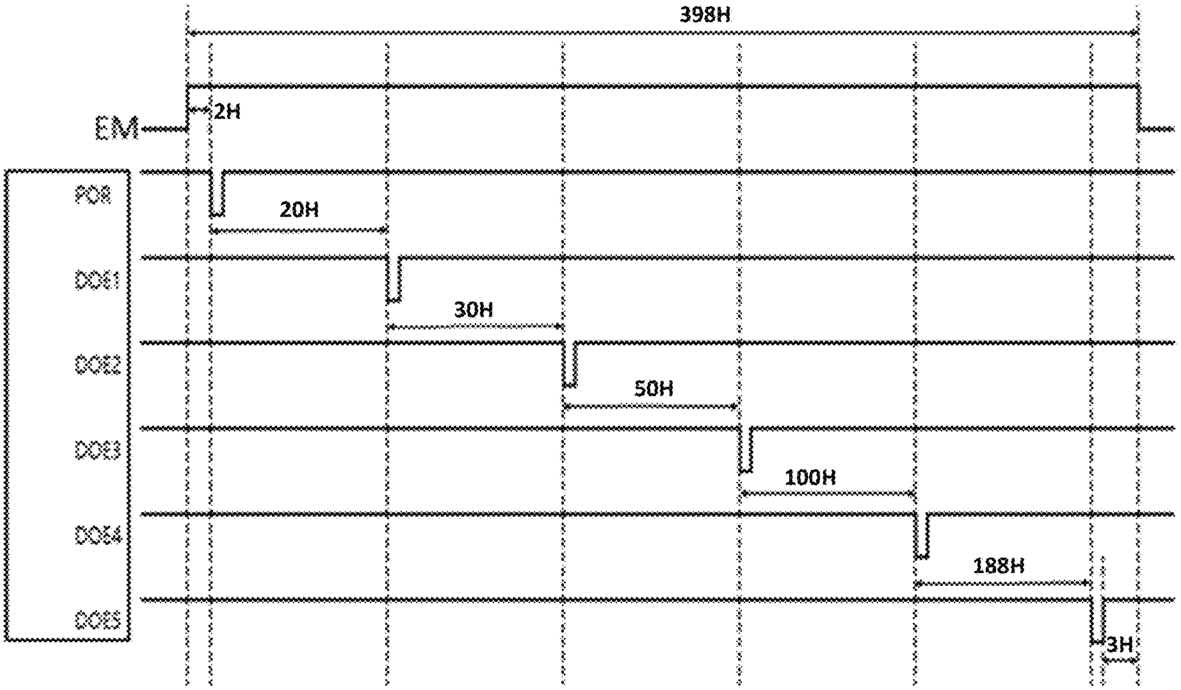
FIG. 15 illustrates a schematic diagram illustrating the relative positions of different signals of the pixel circuit in FIG. 1.

Exemplarily, FIG. 15 specifically illustrates situations of different relative positions between the first scan signal and the light emission control signal EM. In FIG. 15, POR and DOE1~DOE5 represent six positions of the first scan signal, and the low levels of POR and DOE1~DOE5 represent valid pulses of the first scan signal.

Exemplarily, as illustrated in FIG. 15, the duration of the invalid pulse of the light emission control signal EM in the data writing stage is 398H, the duration of the low level of the signals illustrated by POR and DOE1~DOE5 is 5H, and the duration of the valid pulse of the first scan signal may be equal to 5H.

When the first scan signal is a signal illustrated by POR, t1=2H.

When the first scan signal is a signal illustrated by DOE1, t1=22H.

When the first scan signal is a signal illustrated by DOE2, t1=52H.

When the first scan signal is a signal illustrated in DOE3, t1=102H.

When the first scan signal is a signal illustrated by DOE4, t1=202H.

When the first scan signal is a signal illustrated by DOE5, t1=390H.

Figure 16:
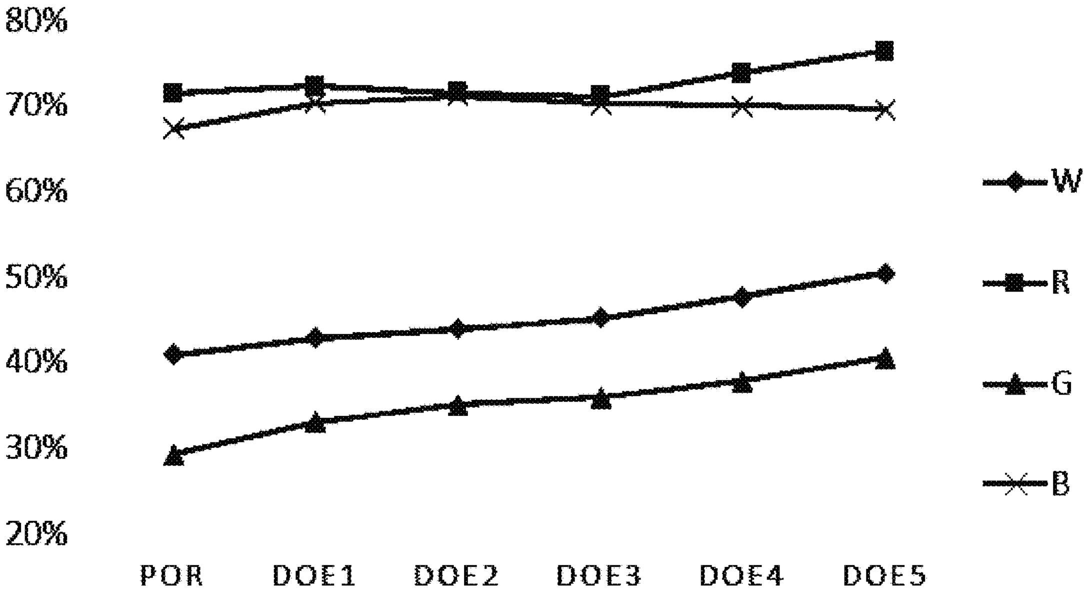
FIG. 16 illustrates a schematic diagram of the brightness corresponding to FIG. 15.

The brightness of the display panel in the first frame at the six relative positions of the signals illustrated in POR and DOE1~DOE5 in FIG. 15 was further tested. The test results are illustrated in FIG. 16. With the increase of t1, the brightness of the light-emitting elements R, G, and B in the first frame gradually increases, and the brightness of the white screen W of the display screen also gradually increases in the first frame.

In some embodiments, t1 may be greater than or equal to 2H.

In some embodiments, t1 may be greater than or equal to 22H.

In some embodiments, as illustrated in FIG. 2, in the first mode, the interval between the end time of the first valid pulse in the (i+1)-th data writing cycle and the start time of the first second valid pulse in the (i+1)-th data writing cycle is t3, t1>t3. It may be understood that, compared with SP11' illustrated in FIG. 5, since t1>t3, the first valid pulse of the first scan signal SP11 is shifted back by at least half of t2, which relatively increases the degree of the shift back of the first valid pulse of the first scan signal SP11.

In some embodiments, t3=3H.

For example, if both the invalid pulse of the light emission control signal and the invalid pulse of the first scan signal are both at a high level, and the second valid pulse of the light emission control signal and the first valid pulse of the first scan signal are both at a low level, then in the data writing phase, the first valid pulse of the first scan signal may be shifted back relative to the rising edge of the light emission control signal. For example, in the data writing phase, the interval between the start time of the first valid pulse of the first scan signal and the rising edge of the light emission control signal is t1, and in the data writing phase, the duration of the high level of the light emission control signal is t2, $$\frac{t1}{t2} \geq 1\%, \text{ and/or, } t1 \geq H.$$

It should be noted that the transistors in the embodiments of the present disclosure may be NMOS transistors or PMOS transistors. For NMOS transistors, the turn-on level is a high level, and the cut-off level is a low level. That is, when the gate of the NMOS transistor is at a high level, the NMOS transistor is turned on between its first electrode and second electrode, and when the gate of the NMOS transistor is at a low level, the NMOS transistor is turned off between its first electrode and second electrode. For PMOS transistors, the turn-on level is a low level, and the cut-off level is a high level. That is, when the control electrode of the PMOS transistor is at a low level, the PMOS transistor is turned on between its first electrode and second electrode, and when the control electrode of the PMOS transistor is at a high level, the PMOS transistor is turned off between its first electrode and second electrode. In some embodiments, the gates of the transistors mentioned above are used as their control electrodes. According to the signal of the gate of each transistor and its type, the first electrode may be used as a source and the second electrode may be used as a drain, or the first electrode may be used as a drain and the second electrode may be used as a source, either of which is considered in the present disclosure. In addition, the turn-on level and cut-off level in the embodiments of the present disclosure are for reference only. The turn-on level may refer to any level that may turn on the transistor and the cut-off level may refer to any level that may cut off/turn off the transistor.

Based on the same inventive concept, embodiments of the present disclosure further provide a driving circuit for providing a signal to a display panel provided in the above embodiments. The display panel may include a pixel circuit and a light-emitting element, where the pixel circuit includes a light emission control module, the light emission control module is configured to make the light-emitting element emit light under the control of a light emission control signal. The pixel circuit includes a first pixel circuit, where the first pixel circuit includes a first reset module. The light-emitting element includes a first light-emitting element that emits light of a first color, and the first reset module provides a first reset signal to the first light-emitting element under the control of a first scan signal. A data writing cycle of the pixel circuit includes a data writing phase and m holding phases. In the data writing phase, the first scan signal includes at least one first valid pulse. The light emission control signal includes one second valid pulse in the data writing phase and in each of the holding phases. The working modes of the display panel include a first mode. In the first mode, the interval between the start time of the first valid pulse in the (i+1)-th data writing cycle and the end time of the last second valid pulse in the i-th data writing cycle is t1, and in the data writing phase, the duration of the light emission control signal being an invalid pulse is t2, where $$\frac{t1}{t2} \geq 1\%, \text{ and/or, } t1 \geq H, H = \frac{1}{F \times n},$$

n is the number of rows of pixel circuit, F is the refresh rate of the display panel in the first mode, m≥1, i≥1, and m and i are integers.

It should be noted that, in the disclosed embodiments, the first scan signal received by the display panel is provided by the driving circuit, and the features of the first scan signal in any of the embodiments described above may be provided by the driving circuit.

Based on the same inventive concept, embodiments of the present disclosure further provide a display device, and the display device includes a display panel provided by the embodiments of the present disclosure. Therefore, the display device has the technical features of a display panel provided by the embodiments of the present disclosure and may achieve the beneficial effects of a display panel provided by the embodiments of the present disclosure, which are not to be repeated herein again.

Figure 17:
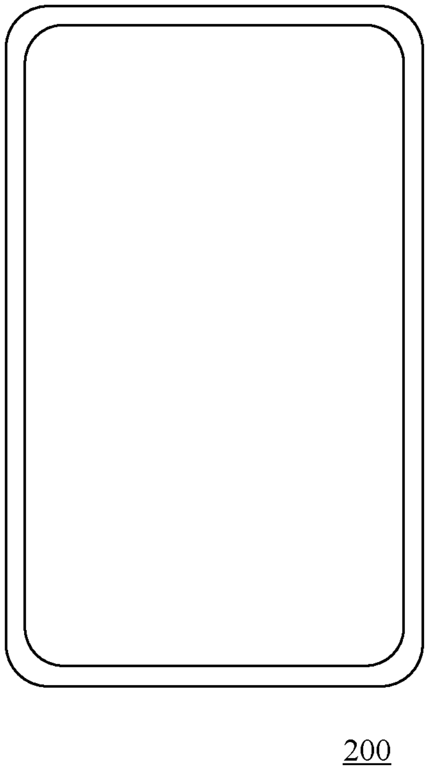
FIG. 17 illustrates a schematic structural diagram of a display device according to various embodiments of the present disclosure.

Exemplarily, FIG. 17 illustrates a schematic structural diagram of a display device according to various embodiments of the present disclosure. As illustrated in FIG. 17, a display device 200 provided in the embodiments of the present disclosure includes a display panel provided in any of the embodiments of the present disclosure described above. The embodiment in FIG. 17 only takes the mobile phone as an example to illustrate the display device 200. It may be understood that the display device 200 provided in the embodiments of the present disclosure may be any electronic product with a display function, including but not limited to the following categories: mobile phone, TV, notebook computer, desktop display, tablet computer, digital camera, smart bracelet, smart glasses, vehicle display, medical equipment, industrial control equipment, touch interactive terminal, etc., which are not specifically limited by the embodiments of the present disclosure.

From the above-mentioned embodiments, it can be seen that the display panel, driving circuit and display device provided by the present disclosure may achieve at least the following beneficial effects.

In the display panel, driving circuit and display device provided by the present disclosure, the relative positions of the first scan signal and the light emission control signal are shifted, and the valid pulse of the first scan signal is shifted back relative to the light emission control signal. After the light-emitting sub-phase of the last holding phase of the i-th data writing cycle ends, the light emission control signal jumps from a low level to a high level, and parasitic capacitance is formed between the light emission control signal line and/or the transistor controlled by the light emission control signal forms and the anode of the first light-emitting element. The light emission control signal jumps from a low level to a high level, which makes the anode potential of the first light-emitting element rise through coupling. Therefore, after the light-emitting sub-phase of the last holding phase of the i-th data writing cycle, the anode of the first light-emitting element may discharge, thereby causing the first light-emitting element to continue to emit light. This is equivalent to increasing the brightness of the last light-emitting sub-phase of the i-th data writing cycle, which facilitates ameliorating the color cast phenomenon.

In the various embodiments of the present disclosure described above, not all details are described, nor the present disclosure is limited to the specific embodiments described. It should be obvious to those skilled in the art that many modifications and variations may be made according to the above description. This description selects and specifically describes these embodiments in order to better explain the principles and practical applications of the present disclosure, so that those skilled in the art may make good use of the present disclosure and modifications based on the present disclosure.

What is claimed is:

1. A display panel, comprising:
a pixel circuit; and
a light-emitting element,
wherein:
the pixel circuit includes a light emission control module, and the light emission control module is configured to make the light-emitting element emit light under control of a light emission control signal;
the pixel circuit includes a first pixel circuit, the first pixel circuit includes a first reset module, the light-emitting element includes a first light-emitting element that emits light of a first color, and the first reset module provides a first reset signal to the first light-emitting element under control of a first scan signal;

a data writing cycle of the pixel circuit includes a data writing phase and m holding phases;

in the data writing phase, the first scan signal includes at least one first valid pulse;

the light emission control signal includes one second valid pulse in the data writing phase and in each of the holding phases;

working modes of the display panel include a first mode, wherein in the first mode, an interval between a start time of a first valid pulse in an (i+1)-th data writing cycle and an end time of a last second valid pulse in an i-th data writing cycle is t1, and in the data writing phase, a duration of the light emission control signal being an invalid pulse is t2, t1/t2≥1%, m≥1, i≥1, and m and i are integers;

the pixel circuit further comprises a second pixel circuit, the second pixel circuit includes a second reset module, the light-emitting element includes a second light-emitting element that emits light of a second color, and the second reset module transmits a second reset signal to the second light-emitting element under control of a second scan signal;

in the data writing phase, the second scan signal includes at least one third valid pulse; and in the first mode, an interval between a start time of the first third valid pulse in the (i+1)-th data writing cycle and an end time of a last second valid pulse in the i-th data writing cycle is t5, and t1≠t5.

2. The display panel according to claim 1, wherein:

$$\frac{t1}{t2} \geq 50\%.$$

3. The display panel according to claim 1, wherein:

in the first mode, an interval between an end time of the first valid pulse in the (i+1)-th data writing cycle and a start time of a first second valid pulse in the (i+1)-th data writing cycle is t3, and t1>t3.

4. The display panel according to claim 3, wherein:

t3>0.

5. The display panel according to claim 4, wherein:

t3≥0.5H, wherein the display panel comprises n rows of pixel circuits, a refresh rate of the display panel in the first mode is F, and $$H = \frac{1}{F \times n}.$$

6. The display panel according to claim 3, wherein:

t3=0.

7. The display panel according to claim 1, wherein:

a duration of the first valid pulse is t4, and $$\frac{t2}{t4} \geq 10.$$

8. The display panel according to claim 1, wherein:

t1>t5.

9. The display panel according to claim 1, wherein:

a duration of the first valid pulse is t4, a duration of the third valid pulse is t6, and t4=t6.

10. The display panel according to claim 1, wherein:

the second reset module provides the second reset signal to the second light-emitting element under control of the first scan signal.

11. The display panel according to claim 1, wherein:

in at least one of the holding phases, the first scan signal includes at least one fourth valid pulse; and in a same data writing cycle, a second valid pulse in a j-th holding phase is a (j+1)-th second valid pulse, and an interval between a start time of a first fourth valid pulse in the j-th holding phase and an end time of the j-th second valid pulse is t7, t1=t7, wherein, 1≤j≤m.

12. The display panel according to claim 1, wherein:

in at least one of the holding phases, the first scan signal includes at least one fourth valid pulse; and in a same data writing cycle, a second valid pulse in a j-th holding phase is a (j+1)-th second valid pulse, and an interval between a start time of a first fourth valid pulse in the j-th holding phase and an end time of the j-th second valid pulse is t7, t1≠t7, wherein, 1≤j≤m.

13. The display panel according to claim 12, wherein:

t7<t1.

14. The display panel according to claim 11, wherein:

a duration of the first valid pulse is t4, a duration of the fourth valid pulse is t8, and t4=t8.

15. The display panel according to claim 1, wherein:

in the data writing phase, the first scan signal includes at least two first valid pulses.

16. A display panel, comprising:

a pixel circuit; and a light-emitting element, wherein:

the pixel circuit includes a light emission control module, the light emission control module is configured to make the light-emitting element emit light under control of a light emission control signal;

the pixel circuit includes a first pixel circuit, the first pixel circuit includes a first reset module, the light-emitting element includes a first light-emitting element that emits light of a first color, and the first reset module provides a first reset signal to the first light-emitting element under control of a first scan signal;

a data writing cycle of the pixel circuit includes a data writing phase and m holding phases;

in the data writing phase, the first scan signal includes at least one first valid pulse;

the light emission control signal includes one second valid pulse in the data writing phase and in each of the holding phases;

working modes of the display panel include a first mode, wherein in the first mode, an interval between a start time of a first valid pulse in an (i+1)-th data writing cycle and an end time of a last second valid pulse in the i-th data writing cycle is t1, $$t1 \geq 1H,\ H = \frac{1}{F \times n},$$

n is the number of rows of pixel circuits, F is a refresh rate of the display panel in the first mode, m≥1, i≥1, and m and i are integers;

the pixel circuit further comprises a second pixel circuit, the second pixel circuit includes a second reset module, the light-emitting element includes a second light-emitting element that emits light of a second color, and the second reset module transmits a second reset signal to the second light-emitting element under control of a second scan signal;

in the data writing phase, the second scan signal includes at least one third valid pulse; and in the first mode, an interval between a start time of the first third valid pulse in the (i+1)-th data writing cycle and an end time of a last second valid pulse in the i-th data writing cycle is t5, and t1≠t5.

17. The display panel according to claim 16, wherein:

in the first mode, an interval between an end time of the first valid pulse in the (i+1)-th data writing cycle and a start time of a first second valid pulse in the (i+1)-th data writing cycle is t3, and t1>t3.

18. A driving circuit configured to provide signals for a display panel, the display panel comprising:

a pixel circuit; and a light-emitting element, wherein:

the pixel circuit includes a light emission control module, the light emission control module is configured to make the light-emitting element emit light under control of a light emission control signal;

the pixel circuit includes a first pixel circuit, the first pixel circuit includes a first reset module, the light-emitting element includes a first light-emitting element that emits light of a first color, and the first reset module provides a first reset signal to the first light-emitting element under control of a first scan signal;

a data writing cycle of the pixel circuit includes a data writing phase and m holding phases;

in the data writing phase, the first scan signal includes at least one first valid pulse;

the light emission control signal includes one second valid pulse in the data writing phase and in each of the holding phases;

working modes of the display panel include a first mode, wherein in the first mode, an interval between a start time of a first valid pulse in an (i+1)-th data writing cycle and an end time of a last second valid pulse in an i-th data writing cycle is t1, and in the data writing phase, a duration of the light emission control signal being an invalid pulse is t2, t1/t2≥1%, and/or t1≥1H, H=1/F×n, n is the number of rows of pixel circuits, F is a refresh rate of the display panel in the first mode, m≥1, i≥1, and m and i are integers;

the pixel circuit further comprises a second pixel circuit, the second pixel circuit includes a second reset module, the light-emitting element includes a second light-emitting element that emits light of a second color, and the second reset module transmits a second reset signal to the second light-emitting element under control of a second scan signal;

in the data writing phase, the second scan signal includes at least one third valid pulse; and in the first mode, an interval between a start time of the first third valid pulse in the (i+1)-th data writing cycle and an end time of a last second valid pulse in the i-th data writing cycle is t5, and t1≠t5.

19. A display device including a display panel, the display panel comprising:

a pixel circuit; and a light-emitting element, wherein:

the pixel circuit includes a light emission control module, the light emission control module is configured to make the light-emitting element emit light under control of a light emission control signal;

the pixel circuit includes a first pixel circuit, the first pixel circuit includes a first reset module, the light-emitting element includes a first light-emitting element that emits light of a first color, and the first reset module provides a first reset signal to the first light-emitting element under control of a first scan signal;

a data writing cycle of the pixel circuit includes a data writing phase and m holding phases;

in the data writing phase, the first scan signal includes at least one first valid pulse;

the light emission control signal includes one second valid pulse in the data writing phase and in each of the holding phases;

working modes of the display panel include a first mode, wherein in the first mode, an interval between a start time of a first valid pulse in an (i+1)-th data writing cycle and an end time of a last second valid pulse in an i-th data writing cycle is t1, and in the data writing phase, a duration of the light emission control signal being an invalid pulse is t2, t1/t2≥1%, and/or t1≥1H, H=1/F×n, n is the number of rows of pixel circuits, F is a refresh rate of the display panel in the first mode, m≥1, i≥1, and m and i are integers;

the pixel circuit further comprises a second pixel circuit, the second pixel circuit includes a second reset module, the light-emitting element includes a second light-emitting element that emits light of a second color, and the second reset module transmits a second reset signal to the second light-emitting element under control of a second scan signal;

in the data writing phase, the second scan signal includes at least one third valid pulse; and in the first mode, an interval between a start time of the first third valid pulse in the (i+1)-th data writing cycle and an end time of a last second valid pulse in the i-th data writing cycle is t5, and t1≠t5.

* * * * *